United States Patent [19]
Desai et al.

[11] Patent Number: 5,831,718
[45] Date of Patent: Nov. 3, 1998

[54] PORTABLE LASER RANGE FINDER AND DIGITAL COMPASS ASSEMBLY

[75] Inventors: Vikram D. Desai, Lake Forest; Jennifer L. Ferrario, Long Beach; Julie L. Bentley, Westchester; Colin N. Sakamoto, Redondo Beach, all of Calif.

[73] Assignee: Raytheon Company, El Segundo, Calif.

[21] Appl. No.: 918,520

[22] Filed: Aug. 21, 1997

[51] Int. Cl.⁶ .............................. G01C 03/08; F41G 01/32
[52] U.S. Cl. .......................................... 356/5.01; 89/41.06
[58] Field of Search .............................. 342/52; 89/41.03, 89/41.06; 356/5.01

[56] References Cited

U.S. PATENT DOCUMENTS

| | | | |
|---|---|---|---|
| 4,949,089 | 8/1990 | Ruszkowski, Jr. | 342/52 |
| 5,669,174 | 9/1997 | Teetzel | 42/103 |

*Primary Examiner*—Mark Hellner
*Attorney, Agent, or Firm*—Leonard A. Alkov; William C. Schubert; Glenn H. Lenzen, Jr.

[57] ABSTRACT

Portable, lightweight, compact, eye-safe, battery-operated laser range finder and digital compass assembly, mountable onto a personal weapon or aiming device, to accurately measure distance, azimuth and elevation angle of a target and increase the accuracy and probability of the hit. The laser range finder and digital compass assembly has a laser transmitter for transmitting an output laser beam having a wavelength in the range of 1.0 to 1.1 microns, an OPO converter for converting the output laser beam to an eye-safe range between 1.5 and 2.2 microns whose time of travel to and from an external target is measured to obtain the range, an expander for expanding the converted output laser beam, a detector for receiving a returned laser beam reflected from the external target and for producing a signal related to the time interval between the output pump beam and the returned pump beam, a digital compass assembly, a microprocessor, and a device for boresighting the expander with the external target, operatively connected to the laser transmitter. The device is placed in a housing adapted for mounting the device onto the personal weapon or aiming device. The laser transmitter is a flashlamp-pumped, battery-operated pump laser.

11 Claims, 4 Drawing Sheets

PORTABLE LASER RANGE FINDER AND DIGITAL COMPASS ASSEMBLY

This invention was made with U.S. Government support provided under Contract No. DAAB07-91-C-K254 awarded by the Department of the Army. The Government has certain rights in this invention.

FIELD OF THE INVENTION

The present invention relates generally to the field of personal laser range finders, and more particularly to a portable, lightweight, compact, eye-safe, battery-operated laser range finder and digital compass assembly.

BRIEF DESCRIPTION OF THE PRIOR ART

One of the multiple sensors for detecting and tracking of desired targets is a laser range finder. Laser range finders conventionally use pulsed lasers for range finding purposes, but can also be used for determining the object's speed. Most prior art laser range finders have a drawback that they work within the near infrared spectrum, up to 1.4 microns. The human eye cannot detect light with a wavelength between 0.7 and 1.4 microns. The lens of the human eye will pass this spectrum with little attenuation to the retina, and will provide considerable energy concentration on the illuminated area of the retina, thus causing eye injury. It has been determined that laser beams having a wavelength in the range of 1.5 to 2.2 microns are absorbed at the surface and safe to the retina, and are therefore considered in the industry as being "eyesafe."

Existing eye-safe laser range finder devices are typically stand alone devices, usually incorporated inside a binocular, rather than being mounted onto an aiming device.

SUMMARY OF THE INVENTION

The preferred embodiment of the present invention provides a portable, lightweight, compact, eye-safe, battery-operated laser range finder and digital compass assembly, mountable onto a personal weapon or aiming device, to accurately measure distance, azimuth and elevation angle of a target and increase the accuracy of the hit. The laser range finder and digital compass assembly preferably includes a laser transmitter (for example, a flashlamp-pumped laser) for transmitting an output laser beam having a wavelength in the range of 1.0 to 1.1 microns, a converter for converting the output laser beam to an eye-safe range between 1.5 and 2.2 microns, an expander for expanding the converted output laser beam whose time of travel to and from an external target is measured to obtain the range, a detector for receiving a returned laser beam reflected from the external target and for producing a signal related to the time interval between the output laser pulse and the returned laser pulse, a digital compass assembly, a microprocessor, and a device for boresighting the expander with the external target, operatively connected to the laser transmitter. The laser range finder and digital compass assembly also includes a housing adapted for mounting the device onto the personal weapon or aiming device.

The foregoing and additional features and advantages of this invention will become further apparent from the detailed description and accompanying drawing figures that follow. In the figures and written description, numerals indicate the various features of the invention, like numerals referring to like features, throughout for the drawing figures and the written description.

DETAILED DESCRIPTION OF THE INVENTION

This invention relates to an eyesafe laser range finder (LRF) and digital compass assembly (DCA) that is mountable onto an external aiming device such as a barrel of a personal weapon, to accurately measure distance, azimuth and elevation angle of a target relative to a boresight of the external device on which LRF/DCA assembly is mounted.

Figure 1:
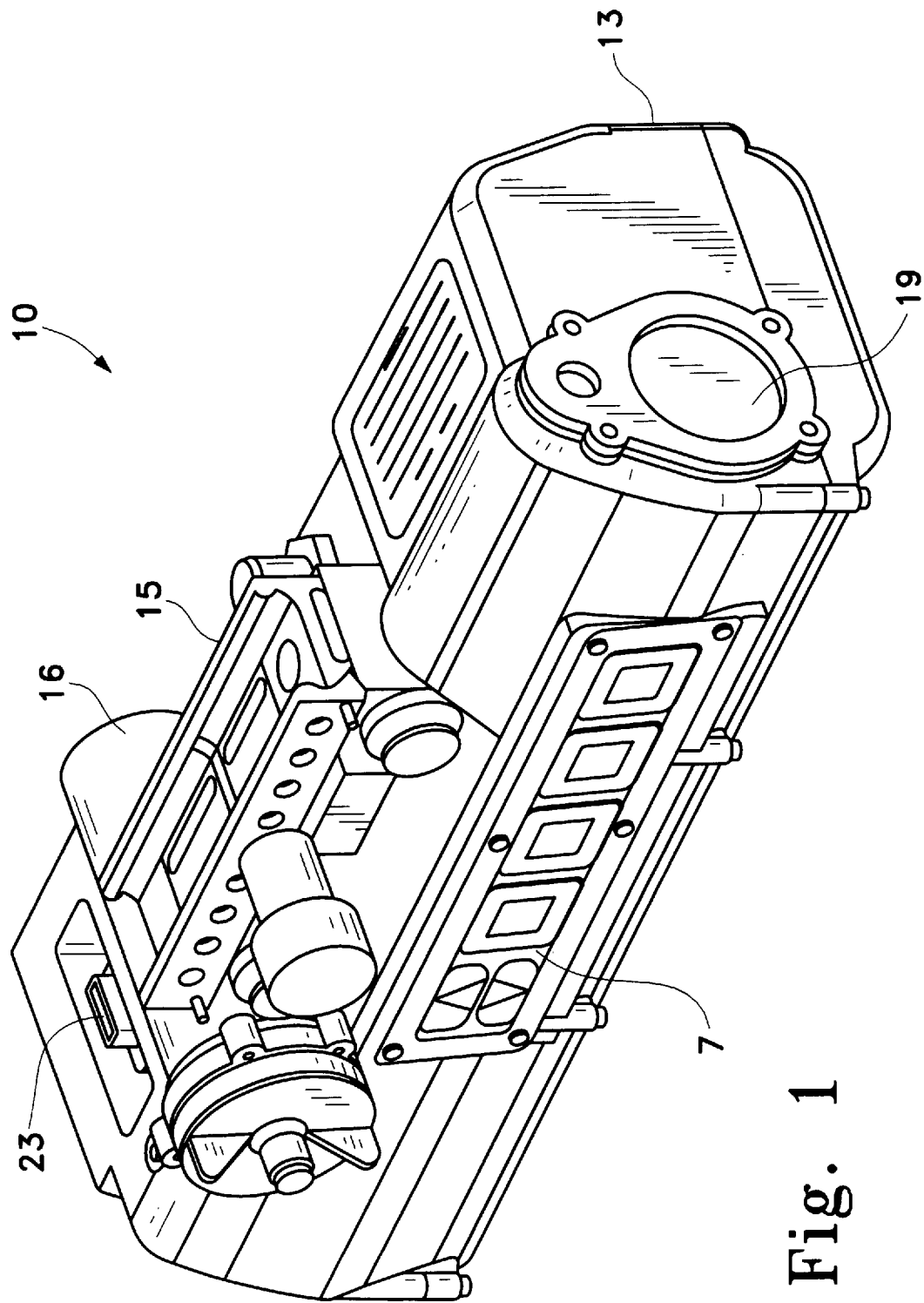
FIG. 1 is a perspective view of a preferred embodiment of a portable, compact, eye-safe laser range finder and digital compass assembly.
Figure 2:
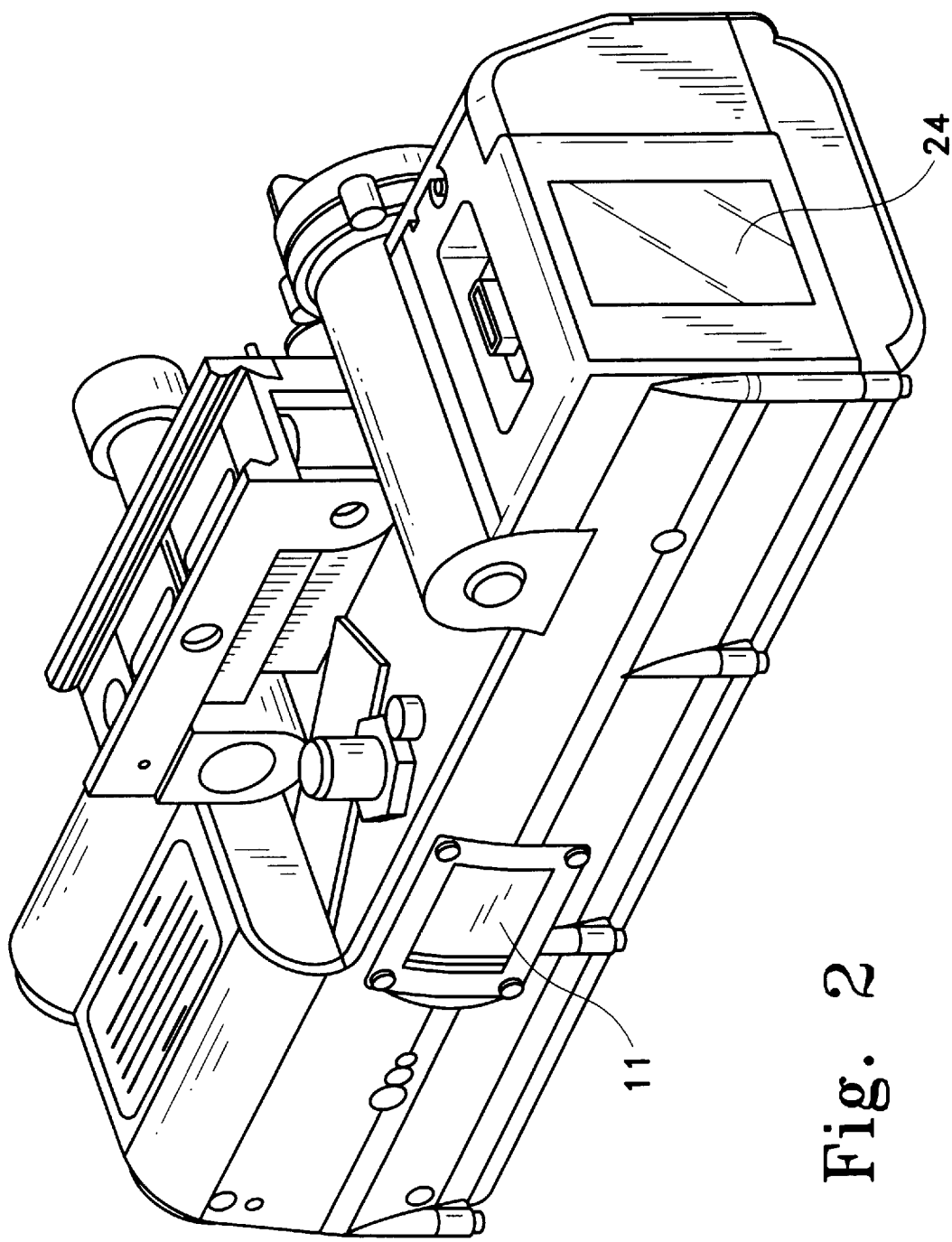
FIG. 2 is another perspective view of the assembly of FIG. 1.
Figure 3:
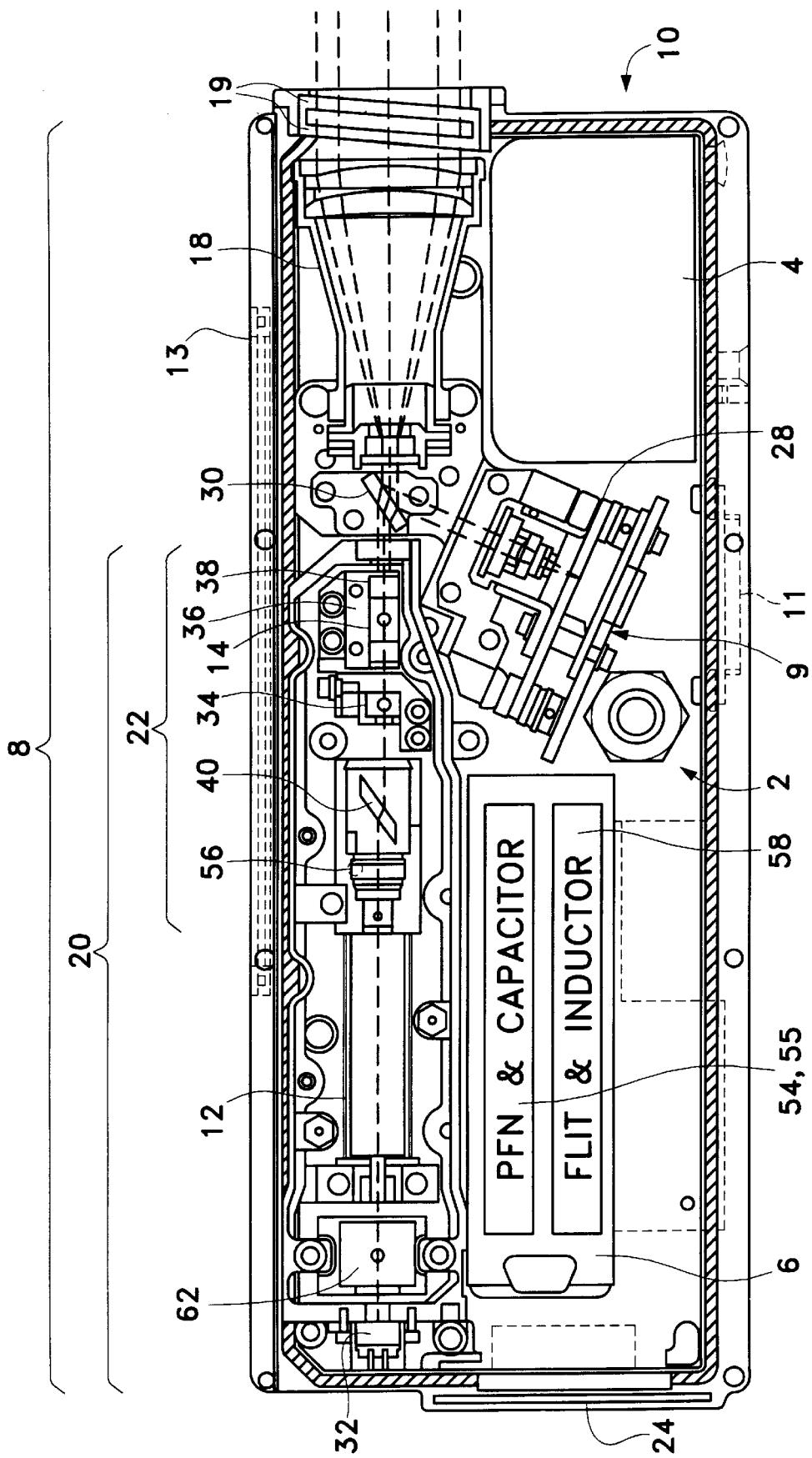
FIG. 3 is a detailed schematic diagram of the bottom side of the assembly of FIG. 1.
Figure 4:
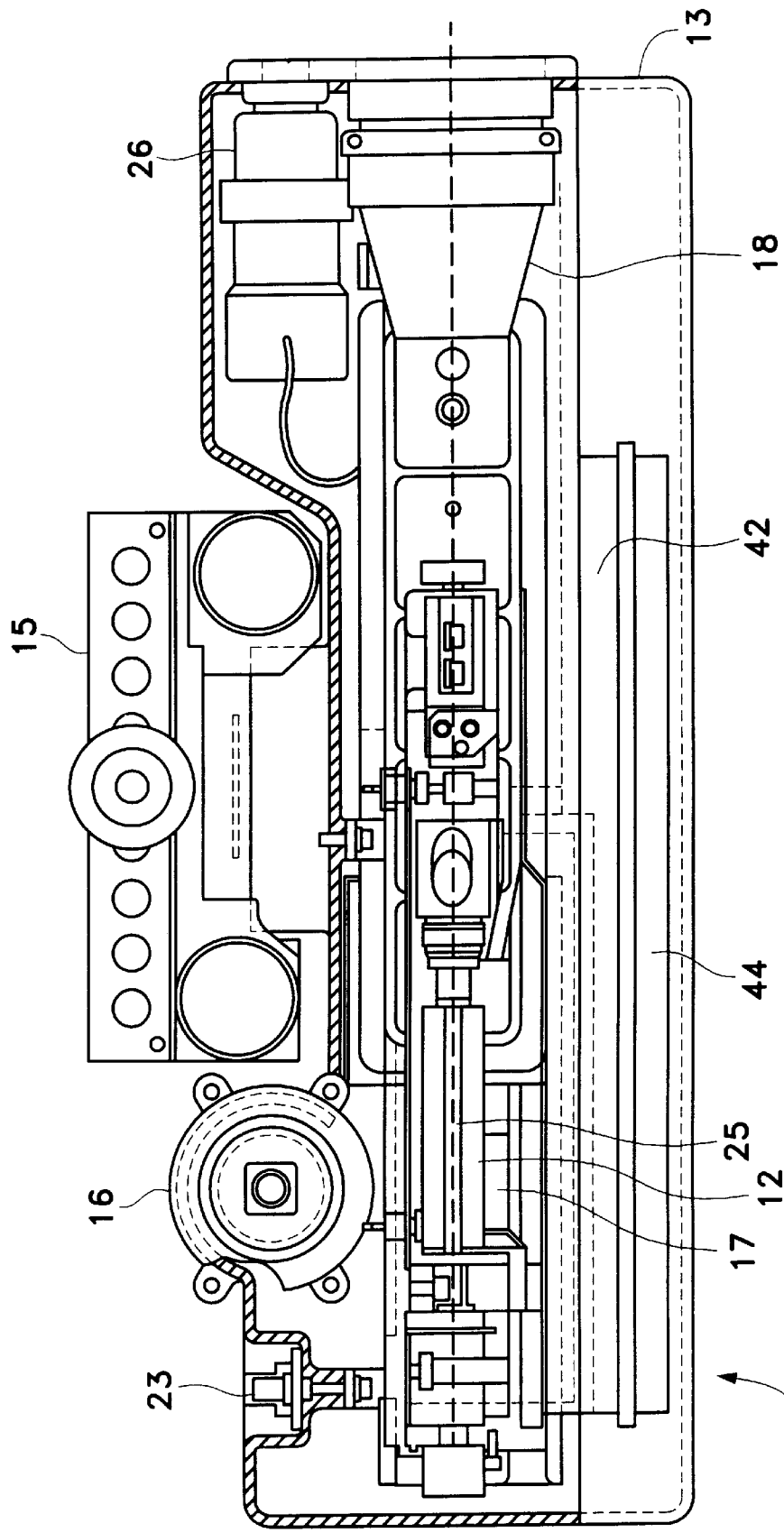
FIG. 4 is a detailed schematic diagram of one side of the assembly of FIG. 1.

FIG. 1 illustrates an LRF/DCA device 10 having a laser range finder 2 and a digital compass assembly 4, shown in detail in FIG. 3 and FIG. 4. The laser range finder 2 is preferably portable, lightweight, compact, and battery-operated adapted to boresight to an external reference and to determine the distance of a target. More particularly, the laser range finder 2 determines the time of flight of a laser pulse to and from a target with the help of a microprocessor 6, having a microprocessor control panel 7 with buttons. The digital compass assembly 4 produces an electronically readable compass signal, and has a vertical angle sensor module which produces an electronically readable inclination signal. The LRF/DCA device 10 is small enough to be easily attached to and carried on a hand-held weapon, and preferably includes a fire control switch 11, shown in FIG. 2, for a user to visually select a target, aim the weapon and to trigger the LRF/DCA device 10 upon the selected target.

As shown in FIGS. 3 and 4, the major subassemblies of the LRF/DCA device 10 are an Nd:YAG flashlamp pumped laser 12, an OPO wavelength converter assembly 36 to shift to an eyesafe wavelength, a telescope 18 with a quarter-wave plate 19, an IR boresight light assembly 26, a receiver 9, the digital compass assembly 4, a battery 16, a flashlamp 17, an LCD display assembly 24, a head-up device (HUD) I/O connector 23, the microprocessor 6, and the fire control switch 11. All these components are mounted in a housing 13 which is used for mounting the LRF/DCA device 10 onto a weapon.

The housing 13 has a rectangular shape and is roughly divided lengthwise into two sections placed side-by-side. The laser 12, the OPO converter assembly 36, the telescope 18 and the quarter-wave plate 19 are all optically coupled and aligned along the same linear optical axis along the first one of the two sections. The IR boresight light assembly 26 is placed parallel to and above the telescope 18. The digital compass assembly 4 is situated in the second section, adjacent to the telescope 18. The digital compass assembly 4, the detector 28 and the microprocessor electronics 6, 54, 55, 58 are arranged within the second section, generally co-planar with the first section. However, the receiver 9 is wedged at an angle between the digital compass assembly 4 and the microprocessor electronics 6, 54, 55, 58, due to the fact that beamsplitter 30 is placed at Brewster's angle relative to the optical axis of telescope 18. Steering/grabber assembly 15 is mounted to an upper surface of the housing 13 above the first and second sections. The battery 16 is also mounted on the top of the housing 13.

An exemplary housing has the following dimensions 8.8"×3.3"×2.3", but can be made smaller, if necessary. The external steering/grabber assembly 15 is used to attach the LRF/DCA device 10 to a rail of a firearm or other weapon, to facilitate boresighting with that weapon. HUD I/O connector 23 is used to send information from the LRF/DCA device 10 to an optional head-up device, worn on the user's head.

As shown in FIG. 3, the laser range finder 2 has a transmitter 8 which provides and directs a laser energy output beam that is reflected off a target and received by the receiver 9. The beam pulses are transmitted at a predetermined pulse repetition rate. The time between the transmission of a pulse at the transmitter 8 and the receipt of the same pulse at the receiver 9 is determined and the range of the target is calculated by the microprocessor 6 and range-counting electronics. The laser range finder 2 provides laser energy in a region of the infrared spectrum which is eye-safe. The laser energy output beam is directed to the target to produce a returned laser beam, which is directed back to the range finder receiver 9. The receiver 9 responds to the returned laser beam with electrical signals whose temporal characteristics represent the time required for the laser energy to travel to the target and back from the target and to the range finder detector 9. The laser range finder 2 utilizes the time of flight and the speed of light to compute the distance to the target.

Referring to the detailed drawings, and more particularly to FIG. 3 showing a detailed schematic diagram from the bottom side of the present invention, a transmitter 8 of the portable laser range finder/digital compass device 10 includes an in-line OPO-shifted pump laser 12, placed in a laser optical cavity resonator 20, and the optical parametric oscillator (OPO) 14. Pump laser 12 preferably consists of a flashlamp-pumped Nd:YAG laser with a wavelength of preferably about 1.06 microns, but can be any other suitable pump laser device, like a Nd:YLF laser. The pump laser 12 has a laser rod 25 which is preferably side-pumped by a flashlamp 17, shown in FIG. 4, placed in parallel with the laser rod 25 in the preferably ceramic laser optical cavity resonator 20, as is well known in the art. The pump laser 12 generates an output in the wavelength range of 1.0 to 1.1 microns and preferably of 1.06 microns. The pump laser 12 has an associated integral spotting and aiming light in the form of IR boresight light assembly 26, because the laser light coming out of the pump laser 12 at a frequency and duration, that renders it virtually invisible. FIG. 4 also illustrates positions of a power supply board 42 and a logic board 44, used for supply of power and information/range processing.

Telescope 18 and the receiver 9 use a polarization beam splitting concept to deliver more energy with smaller optics to a detector 28, part of the receiver 9. Output of the pump laser 12 is p-polarized by a Brewster plate 40 and passes through a polarizing beam splitter 30 and thence through the telescope 18. The output laser beam is expanded by the telescope 18, which also reduces the beam divergence by dividing the angle of divergence by the magnification of the telescope. The expanded laser output beam goes through a quarter-wave plate 19, where the linearly p-polarized beam becomes circularly polarized. The output laser beam then hits the target and the returned laser beam passes through the quarter-wave plate 19 where the return laser beam becomes a linearly s-polarized beam, orthogonal to p-polarization.

Light from the return laser beam then passes through the telescope 18, reflects off of the polarizing beam splitter 30, passes through the receiver 9 and finally focuses on the detector 28, which is preferably an avalanche photodiode, preferably 80 microns in size. Receiver 9 and logic electronics converts this energy signal into a range which is displayed on the display of the LCD display assembly 24. The azimuth and elevation angles are calculated for the same target by the DCA digital compass assembly 4, the DCA digital compass assembly 4 is located as far as possible within the package to provide maximum electrical isolation. The data then is displayed on the LCD display assembly 24 along with the range.

Before arriving at the telescope 18, the output beam from the pump laser 12 is processed by the optical parametric oscillator 14 system which is housed inside an OPO resonant cavity 22 that is included within the laser optical cavity resonator 20. Inside the laser optical cavity resonator 20 there is a laser mirror end 32, accompanied by two wedges 62 the combination of which steers the laser beam and maintains it in alignment with the laser optical cavity resonator 20. Inside both the laser optical cavity resonator 20 and OPO resonant cavity 22 there is a first OPO mirror 34, the OPO wavelength converter assembly 36 and a second OPO mirror 38. Mirrors 32 and 34 are coated for high transmission of beams in the wavelength range of 1.0 to 1.1 microns, and for high reflection of beams in the wavelength range of 1.5 to 2.2 microns. Second OPO mirror 38 is coated by a multi-layer film deposited on the crystal of the OPO wavelength converter assembly 36 to have high reflectance in the wavelength range of 1.0 to 1.1 microns, preferably about 100% for 1.06 micron wave, and partial reflectance for beams in the wavelength range of 1.5 to 2.2 microns, preferably about 60% reflectance of 1.57 micron waves.

The OPO wavelength converter assembly 36 is a crystal, preferably KTP crystal, which converts the laser pump beam having the 1.06 micron wavelength to a beam having 1.57 micron wavelength. The pump laser 12 and the OPO 14 preferably both utilize the same second OPO mirror 38. The OPO resonator is formed by the first OPO mirror 34 and the second OPO mirror 38. The first OPO mirror 34 transmits the beam from the pump laser 12 and reflects the signal at 1.57 microns. The second OPO mirror 38 reflects the beam from the pump laser 12 and transmits the signal at 1.57 microns. Inside the OPO resonant cavity 22 the pump laser beams are reflected from the second OPO mirror 38 back into the OPO wavelength converter assembly 36 for further reflections within the OPO resonant cavity 22 and the laser optical cavity resonator 20. The first OPO mirror 34 can be tilted to adjust its alignment within the OPO resonant cavity 22.

The battery 16 is preferably a NiCad battery, although a $LiMnO_2$ battery is also suitable for use. A flashlamp-triggered pulse forming network (PFN) 54 includes a PFN capacitor 55 located immediately adjacent pump laser 12 to thereby preheat the pump laser 12 during non-operating and non-light producing modes, and to supply the necessary pumping energy during operating or light producing modes. PFN 54 transfers the energy from the battery 16 to the pump laser 12. FL/T and inductor assembly 58 shapes the laser pulse beam. The wavelength of the pump laser 12 output beam is typically very temperature dependent and the LRF/DCA assembly 10 requires a stable operating environment to maintain the desired output wavelength. The illustrated embodiment is also provided with a Q-switch 56, which increases the pump laser 12 energy by narrowing the laser energy pulse width and increasing its peak power, thereby improving the range resolution. The Q-switch 56 may, for example, be an acousto-optic or an electro-optic Q-switch 56. Electro-optic Q-switches conventionally provide a mechanism for enhancing the pump laser 12 output by blocking laser light from lasing, until the laser is completely filled. The electro-optic Q-switch then releases all the energy in a very short pulse of high peak power, by optically opening the resonator path. This is accomplished through removing or applying a high drive voltage to the Q-switch. Application or removal of the high drive voltage allows the Q-switch 56 to perform as a low loss transmission medium. An acousto-optic Q-switch accomplishes the same results as an electro-optic Q-switch by changing the refractive angle of the laser light passing through the Q-switch, by impressing a RF signal on the Q-switch, varying the alignment between the laser beam and the resonator mirror.

When the pump laser 12 soaks up enough energy, the light resonates between the laser end mirror 32 and the second OPO mirror 38. The output from the OPO 14 is fed to the polarizing beam splitter 30, the telescope 18 and the quarter-wave plate 19, toward the target. The polarizing beam splitter 30 is a component separating device because it guides the returned laser beam to a path outside of the laser light path and away from the laser optical cavity resonator 20. An exemplary multilayered dielectric film embodiment of the polarizing beam splitter 30 has polarization film characteristics of reflecting 85% of the s-polarized light components and transmitting 97% of the p-polarized light components of the output laser beam and the returned laser beam, incident on the multilayered dielectric film.

The polarizing beam splitter 30 is disposed at a predetermined angle (about 56 degrees) relative to the laser optical path, in order to reflect the returned laser beam away from the pump laser 12 and to direct it to the detector 28 of the receiver 9, which is connected to a distance determination device. The distance determination device represented with the receiver 9 computes time interval T, which is the time between pulses. It then computes the distance from a reference location to target location using a microprocessor and range-counter by the formula TC/2=D, where C is the speed of light and D is the distance between the target and the reference location. This computed difference may be displayed on the display of the LCD display assembly 24 and/or fed to the microprocessor 6 for further processing.

The digital magnetic compass 4 may be a Wild DTC distributed by E Leitz, for simultaneous azimuth, elevation (vertical graduation) and bank (inclination of horizon) measurement. The instrument contains several sensors to measure the magnetic field and the direction of the gravity vector, its own microprocessor with memory, and a communication interface. It transmits measurements in digital form to the microprocessor 6 and uses its own data analysis software. Three components of the magnetic field are independently measured by solid-state sensors and at the same time a reference plane is defined by two gravity sensors. Using the rules of vector algebra and coordinate transformation, the azimuth, i.e., the angle between the horizontal component of the magnetic field and a designated axis (line of sight) of the instrument, is calculated. The DCA device has to be calibrated for the particular weapon upon which it is mounted and this calibration information is made available to the microprocessor 6. By combining the calibration information, the calculated range to a target and the digital input from the compass, the microprocessor 6 can calculate the appropriate azimuth, elevation and bank with which the user must aim the weapon in order to hit the target.

It will be appreciated that a laser range finder and digital compass constructed in accordance with the present invention may have substantially reduced cost, size and complexity compared to typical prior art devices. In particular, it may be portable, battery-operated and eye-safe and may be readily adapted for use by military forces, security forces, surveyors, sportsmen and others.

While this invention has been described with reference to its presently preferred embodiment(s), its scope is only limited insofar as defined by the following set of claims and all equivalents thereof.

What is claimed is:

1. An eye-safe portable laser range finder and digital compass assembly, mountable onto a personal weapon or other aiming device, comprising:

a laser transmitter for transmitting an eye-safe laser beam having a wavelength between 1.5 and 2.2 microns to an external target, said laser transmitter including a converter for converting an input laser beam having a wavelength of from about 1.0 to 1.1 microns, to an output laser beam having a wavelength of from about 1.5 to 2.2 microns, and an expander for expanding said eyesafe laser beam to thereby reduce its divergence;

a detector for producing a return signal upon the reception of a return laser beam corresponding to a portion of said eyesafe laser beam that has been reflected from the external target;

a digital compass for producing a compass output signal defining azimuth and elevation angle;

a processor for processing the return signal from said detector and the compass output signal from said digital compass to measure distance, azimuth and elevation angle of the external target;

a boresighting member for boresighting said expander with the external target, operatively connected to said laser transmitter; and a housing containing the device, wherein said housing includes a mount for mounting the eye-safe portable laser range finder and digital compass assembly onto the aiming device.

2. The device as claimed in claim 1, wherein said laser transmitter comprises a pump laser that is flashlamp-pumped, battery-operated and placed inside a laser optical cavity resonator.

3. The device as claimed in claim 1 wherein said converter comprises an OPO wavelength converter which is placed within an OPO resonant cavity, which itself is placed inside said laser optical cavity resonator.

4. The device as claimed in claim 1 wherein said expander comprises an optical telescope.

5. The device as claimed in claim 1 wherein said processor comprises a microprocessor with a display, said microprocessor being configured and programmed to calculate the range from the signal related to the time interval between said converted output pump beam and said returned pump beam, and to display the range, azimuth and elevation angle of the external target.

6. The device as claimed in claim 1 further comprising a Q-switch for increasing the energy of the output laser beam.

7. The device as claimed in claim 1 further comprising a first polarizing means for separating a first polarization corresponding to the output laser beam from a second polarization corresponding to the return laser beam, and a second polarizing means for converting the first polarization to the second polarization.

8. The device as claimed in claim 7, wherein the first polarizing means includes a polarization plate for transmitting p-polarized light and for reflecting s-polarized light.

9. The device as claimed in claims 7 or 8, wherein said second polarizing means includes a quarter-wave plate for converting p-polarized light to circularly polarized light and for converting circularly polarized light to s-polarized light.

10. The device as claimed in claim 1 wherein the output laser beam has a wavelength of 1.06 microns and the converted output laser beam has a wavelength of 1.57 microns.

11. An eye-safe portable laser range finder and digital compass assembly, mountable onto a personal weapon or other aiming device, comprising:

a laser transmitter for transmitting an eye-safe laser beam having a wavelength between 1.5 and 2.2 microns to an external target, said laser transmitter including
        a Q-switch for increasing the energy of the output laser beam,
        a converter for converting an input laser beam having a wavelength of from about 1.0 to 1.1 microns, to an output laser beam having a wavelength of from about 1.5 to 2.2 microns, and
        an expander for expanding said eyesafe laser beam to thereby reduce its divergence;

a detector for producing a return signal upon the reception of a return laser beam corresponding to a portion of said eyesafe laser beam that has been reflected from the external target;

a first polarizing means optically coupled between the converter and the detector for separating a first polarization corresponding to the output laser beam from a second polarization corresponding to the return laser beam;

a second polarizing means optically coupled between the expander and the external target for converting the first polarization to the second polarization;

a digital compass for producing a compass output signal defining azimuth and elevation angle;

a processor for processing the return signal from said detector and the compass output signal from said digital compass to measure distance, azimuth and elevation angle of the external target;

a boresighting member for boresighting said expander with the external target, operatively connected to said laser transmitter; and a housing containing the device wherein:
        said housing includes a mount for mounting the eye-safe portable laser range finder and digital compass assembly onto the aiming device;
        said laser transmitter comprises a pump laser that is flashlamp-pumped, battery-operated and placed inside a laser optical cavity resonator;
        said converter comprises an OPO wavelength converter which is placed within an OPO resonant cavity, which itself is placed inside said laser optical cavity resonator;
        said expander comprises an optical telescope;
        said processor comprises a microprocessor with a display, said microprocessor being configured and programmed to calculate the range from the signal related to the time interval between said converted output pump beam and said returned pump beam, and to display the range, azimuth and elevation angle of the external target;
        said first polarizing means includes a polarization plate for transmitting p-polarized light and for reflecting s-polarized light;
        said second polarizing means includes a quarter-wave plate for converting p-polarized light to circularly polarized light and for converting circularly polarized light to s-polarized light to; and
        the input laser beam has a wavelength about 1.06 microns and the output laser beam has a wavelength of about 1.57 microns.

\* \* \* \* \*